(12) United States Patent
Yamamoto et al.

(10) Patent No.: US 11,613,181 B2
(45) Date of Patent: Mar. 28, 2023

(54) INFORMATION DISPLAYING APPARATUS FOR VEHICLE

(71) Applicant: Toyota Jidosha Kabushiki Kaisha, Toyota (JP)

(72) Inventors: Kei Yamamoto, Toyota (JP); Kenji Sato, Toyota (JP); Takashi Nishimoto, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 17/144,617

(22) Filed: Jan. 8, 2021

(65) Prior Publication Data

US 2021/0213832 A1 Jul. 15, 2021

(30) Foreign Application Priority Data

Jan. 14, 2020 (JP) .............................. JP2020-003788

(51) Int. Cl.
| | |
|---|---|
| *B60K 37/02* | (2006.01) |
| *B60K 35/00* | (2006.01) |
| *B60W 50/14* | (2020.01) |
| *G06V 10/25* | (2022.01) |
| *G02B 27/01* | (2006.01) |

(52) U.S. Cl.
CPC .............. *B60K 37/02* (2013.01); *B60K 35/00* (2013.01); *B60W 50/14* (2013.01); *G06V 10/25* (2022.01); *B60K 2370/1523* (2019.05); *B60K 2370/29* (2019.05); *B60K 2370/56* (2019.05); *B60K 2370/563* (2019.05); *B60K 2370/60* (2019.05); *B60W 2050/146* (2013.01); *G02B 27/0101* (2013.01)

(58) Field of Classification Search
CPC .................... B60K 37/02; B60K 35/00; B60K 2370/1523; B60K 2370/29; B60K 2370/569; B60K 2370/60; B60W 50/14; B60W 2050/146; G06V 10/25; G02B 27/0101
See application file for complete search history.

(56) References Cited

U.S. PATENT DOCUMENTS

| | | | |
|---|---|---|---|
| 2011/0175754 A1* | 7/2011 | Karpinsky | B60K 35/00 340/963 |
| 2016/0157712 A1* | 6/2016 | Borden | A61B 3/005 351/222 |
| 2017/0136877 A1* | 5/2017 | Boss | G06F 3/013 |
| 2019/0212551 A1 | 7/2019 | Fujita | |

(Continued)

FOREIGN PATENT DOCUMENTS

| | | |
|---|---|---|
| CN | 109690389 A | 4/2019 |
| CN | 109789780 A | 5/2019 |

(Continued)

*Primary Examiner* — Douglas M Wilson
(74) *Attorney, Agent, or Firm* — Dinsmore & Shohl LLP

(57) ABSTRACT

An information displaying apparatus for a vehicle includes a translucent cover panel, first and second displays which are placed in erect positions located on one side of the cover panel, and imaging optical elements which are placed beside the first and second displays along a surface of the cover panel on the one side of the cover panel, and are configured to form real images of screens of the first and second displays as floating images in a region located on the other side of the cover panel.

6 Claims, 2 Drawing Sheets

(56) References Cited

U.S. PATENT DOCUMENTS

2019/0232787 A1\* 8/2019 Tane ................ G02B 27/0101
2020/0410469 A1\* 12/2020 Mikami ............. G06K 7/10297

FOREIGN PATENT DOCUMENTS

| JP | H0840114 A | 2/1996 |
| JP | 2010190960 A | 9/2010 |
| JP | 2014-240213 A | 12/2014 |
| JP | 2018045098 A | 3/2018 |

\* cited by examiner

US 11,613,181 B2

INFORMATION DISPLAYING APPARATUS FOR VEHICLE

CROSS REFERENCE TO RELATED APPLICATION

This application claims priority to Japanese Patent Application No. 2020-003788 filed on Jan. 14, 2020, which is incorporated herein by reference in its entirety including the specification, claims, drawings, and abstract.

TECHNICAL FIELD

The present disclosure relates to a structure of an information displaying apparatus for a vehicle, the information displaying apparatus being mounted on the vehicle and configured to provide display of information to a viewer, such as a driver.

BACKGROUND

An instrument panel of a vehicle is equipped with meters, such as a speedometer and a tachometer, for displaying various items of information about a vehicle. The meters are installed in a meter case having a hood which is protruded from the instrument panel toward the driver (see, for example, JP H08-40114 A).

There has been suggested a structure in which a liquid crystal display panel is installed within a meter case for accommodating meters, and a virtual image of the liquid crystal display panel is formed through a transmitting reflector plate so as to be displayed on an opposite side of a viewer with respect to the transmitting reflector plate (see, for example, JP 2014-240213 A).

SUMMARY

In conventional techniques described in JP H08-40114 A and JP 2014-240213 A, the hood provided on an upper part of the meter case is protruded toward the driver, to thereby prevent a front glass from reflecting, for example, illumination of a meter and thus prevent formation on the front glass of an image of the shape of the meter. However, the hood protruded toward the driver may impose limitations on a design of a vehicle cabin.

Under the circumstances, it is an object of the present disclosure to provide an information displaying apparatus for a vehicle that allows for a high degree of flexibility in designing a vehicle cabin.

In an aspect, an information displaying apparatus for a vehicle according to the present disclosure includes a translucent cover panel, a display which is placed in an erect position located on one side of the cover panel and is configured to display vehicle formation, and an imaging optical element which is placed beside the display along a surface of the cover panel, the surface being on the one side of the cover panel, and is configured to form a real image of a screen of the display as a floating image on the other side of the cover panel.

The above-described configuration can allow display of vehicle information, such as a speed, at an arbitrary position within a vehicle cabin, which can lead to an increased degree of flexibility in designing the vehicle cabin.

In the information displaying apparatus for a vehicle according to an aspect of this disclosure, the cover panel may be attached to an instrument panel installed in a front region of the vehicle cabin, the display may be attached to the cover panel on an interior side of the instrument panel, the imaging optical element may be placed on the cover panel adjacent to the display on a vehicle front side of the display on the interior side of the instrument panel, and the screen of the display may be displayed as the real image that is converged through the cover panel into the floating image between the imaging optical element and a viewer on an exterior side of the instrument panel.

In this way, the image of the screen on the display is displayed as the real image converged between the imaging optical element and the viewer, which can prevent a window reflection of the image, and can, in turn, improve visibility of the viewer. In addition, because the image is not reflected in the front glass even when no hood is installed, there is no necessity to protrude any hood from the instrument panel toward the driver. As a result, an available space within the vehicle cabin can be broadened.

In the information displaying apparatus for a vehicle according to an aspect of this disclosure, two or more sets of the display and the imaging optical element may be attached to the cover panel on the interior side of the instrument panel.

When configured as described above, two or more items of vehicle information can be displayed as floating images in the air above the instrument panel, which can facilitate observation of relevant items of vehicle information.

In the information displaying apparatus for a vehicle according to an aspect of this disclosure, the cover panel may be composed of a smoky-colored resin molding. The above-described configuration can prevent the display from becoming deteriorated due to exposure to sunlight.

According to the present disclosure, there is provided the information displaying apparatus for a vehicle that can contribute to a high design of flexibility in designing the vehicle cabin.

BRIEF DESCRIPTION OF DRAWINGS

Embodiments of the present disclosure will be described based on the following figures, wherein.

DESCRIPTION OF EMBODIMENTS

Figure 1:
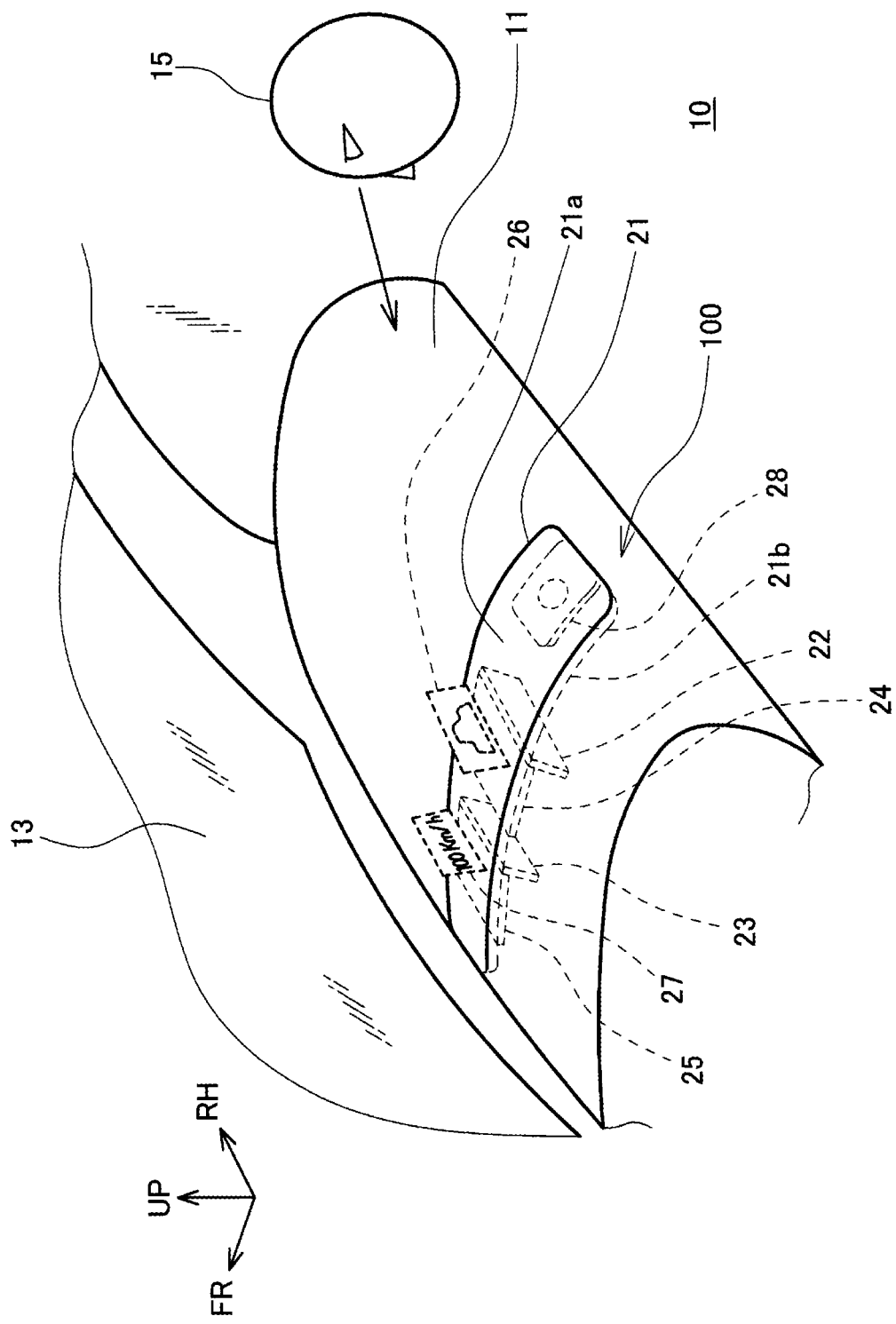
FIG. 1 is a perspective view showing an information displaying apparatus for a vehicle according to an embodiment in a state where the information displaying apparatus is attached to an instrument panel.

Hereinafter, an information displaying apparatus for a vehicle 100 according to an embodiment will be described with reference to the drawings. In the description below, the information displaying apparatus for a vehicle 100 attached to an instrument panel 11 in a front region of a vehicle cabin 10 is explained, although the information displaying apparatus for a vehicle 100 may be attached to a component other than the instrument panel 11. It should be noted that an arrow FR, an arrow UP, and an arrow RH indicated in the drawings represent a front direction (a travel direction), an upward direction, and a rightward direction of a vehicle, respectively. Further, directions opposite to those indicated by the arrows FR, UP, and RH represent a rear direction, a downward direction, and a leftward direction of the vehicle, respectively. Hereinafter, unless otherwise specified, directions described simply using terms, such as front and rear, left and right, or up and down, denote front and rear in a vehicle longitudinal direction, left and right in a vehicle lateral direction (vehicle width direction), or up and down in a vehicle vertical direction.

As illustrated in FIG. 1, the information displaying apparatus for a vehicle 100 includes a translucent cover panel 21, a first display 22 and a second display 23 which are placed in erect positions on an interior side 21b being one side of the cover panel 21 and are configured to display vehicle information, and a first imaging optical element 24 and a second imaging optical element 25 which are placed beside the first and second displays 22 and 23, respectively, along a surface of the cover panel 21 located on the interior side 21b thereof. In addition, a smartphone 28 is attached to the cover panel 21 on the interior side 21b of the cover panel 21 at a position located on a vehicle rear side of the first and second displays 22 and 23. The smartphone 28 is arranged with its screen facing up.

The cover panel 21 is a plate-shaped member which is a smoky-colored resin molding, and is curved so as to conform to a contour of the instrument panel 11 which is located below a front glass 13 in the front region of the vehicle cabin 10. The first and second displays 22 and 23 are, for example, liquid crystal displays which are configured to display a speed, an image of a video telephone, and the like. Each of the first and second imaging optical elements 24 and 25 has, for example, a dihedral corner reflector array structure, and is configured to divide a light beam into fine rays through discrete unit optical elements and collect and converge the divided fine rays into an image using a geometrical optical technique. The first and second imaging optical elements 24 and 25 are located on a vehicle front side of the first and second displays 22 and 23, respectively.

Figure 2:
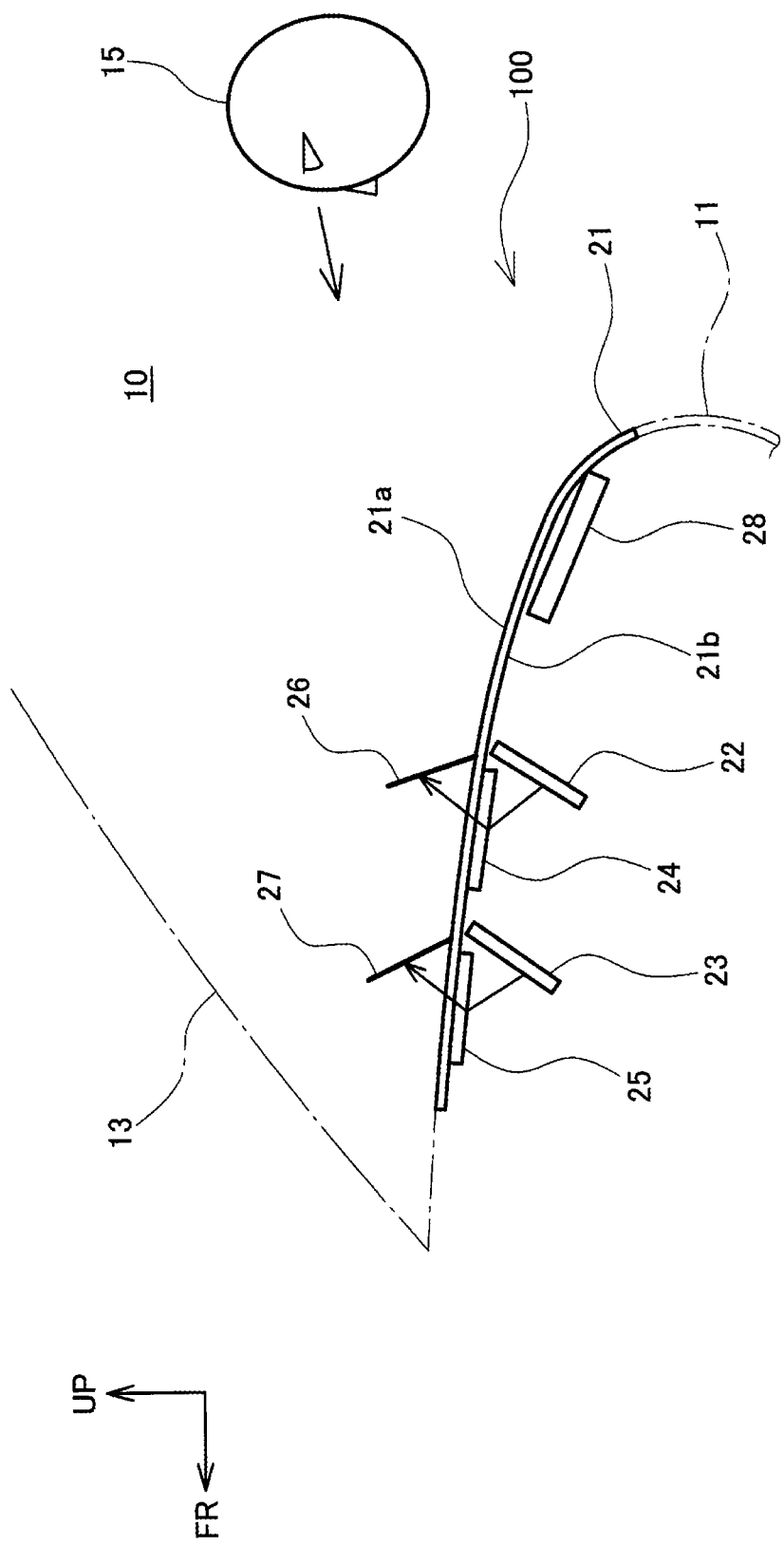
FIG. 2 is a side view of the information displaying apparatus for a vehicle according to the embodiment.

As shown in FIG. 2, the first and second imaging optical elements 24 and 25 form real images 26 and 27 of screens of the first and second displays 22 and 23 as floating images in a region located on an exterior side 21a of the instrument panel 11, the exterior side 21a being the other side of the cover panel 21. For example, when the first display 22 is operated to display the image of the video telephone and the second display 23 is operated to display an image of a speed indication, the real images 26 and 27 representing the images of the video telephone and the speed indication are formed above a surface of the cover panel 21. A viewer 15 seeing the two real images 26 and 27 can recognize the image of the video telephone or the image of the speed indication.

Because the real images 26 and 27 are not reflected in the front glass 13, there is no need to install, in the information displaying apparatus for a vehicle 100 according to the embodiment, a hood which is protruded toward the viewer 15 at a position above the cover panel 21, whereby a usable space within the vehicle cabin 10 can be broadened. Elimination of the need to install the hood can contribute to an increased degree of flexibility in designing a cabin space.

In addition, the viewer 15 can observe the screen of the smartphone 28 through the cover panel 21, and can check, for example, vital data of the viewer 15 displayed on the screen of the smartphone 28.

Further, the cover panel 21, which is composed of the smoky-colored resin molding, can function to prevent deterioration of the first and second displays 22 and 23 as well as the smartphone 28 that could otherwise occur due to exposure to sunlight. Still further, because the cover panel 21 is composed of the smoky-colored resin molding, edges of the first and second displays 22 and 23, the first and second imaging optical elements 24 and 25, the smartphone 28, and the like become blurry in the real images 26 and 27 seen by the viewer 15, which can cause the viewer 15 to realistically feel that the real images 26 and 27 are actually floating while viewing the real images 26 and 27.

Moreover, because two or more sets of the display and the imaging optical element are installed, the viewer 15 can visually observe two or more items of vehicle information with great facility.

The invention claimed is:

1. An information displaying apparatus for a vehicle, the information displaying apparatus comprising:
    a translucent cover panel;
    a display that is placed in an erect position located on one side of the translucent cover panel, and is configured to display vehicle information;
    a smartphone attached to an interior side of the translucent cover panel at a position located on a vehicle rear side of the display; and
    an imaging optical element that is placed beside the display along a surface of the translucent cover panel, the surface being on the one side of the translucent cover panel, and is configured to form a real image of a screen of the display as a floating image in a region located on the other side of the translucent cover panel.

2. The information displaying apparatus for a vehicle according to claim 1, wherein:
    the translucent cover panel is attached to an instrument panel installed in a front region of a vehicle cabin;
    the display is attached to the translucent cover panel on an interior side of the instrument panel;
    the imaging optical element is placed on the translucent cover panel adjacent to the display on a vehicle front side of the display on the interior side of the instrument panel; and
    the screen of the display is displayed as the real image that is converged through the translucent cover panel into the floating image between the imaging optical element and a viewer on an exterior side of the instrument panel.

3. The information displaying apparatus for a vehicle according to claim 2, wherein two or more sets of the display and the imaging optical element are attached to the translucent cover panel on the interior side of the instrument panel.

4. The information displaying apparatus for a vehicle according to claim 1, wherein the translucent cover panel is composed of a smoky-colored resin molding.

5. The information displaying apparatus for a vehicle according to claim 2, wherein the translucent cover panel is composed of a smoky-colored resin molding.

6. The information displaying apparatus for a vehicle according to claim 3, wherein the translucent cover panel is composed of a smoky-colored resin molding.

* * * * *